Nov. 11, 1947.        D. MON G. MAINWAL        2,430,518
SCREEN
Filed Dec. 3, 1945

Inventor

Dong Mon Gee Mainwal,

By Clarence A. O'Brien
and Harvey B. Jacobson
Attorneys

Patented Nov. 11, 1947

2,430,518

UNITED STATES PATENT OFFICE 2,430,518

SCREEN

Dong Mon Gee Mainwal, Detroit, Mich.

Application December 3, 1945, Serial No. 632,358

3 Claims. (Cl. 154—46)

My invention as described herein, and illustrated in the accompanying drawings, consists of a screen, an object of which is to provide a screen formed of stamped out sheet material.

Another object of my invention is to provide a sheet screen formed to admit light and air but to obscure vision from outside.

A further object of this invention is to provide a flexible sheet screen formed to shed water, snow, wind and to obscure vision from one side, but which will ventilate and permit vision therethrough from the other side.

Figure 1:
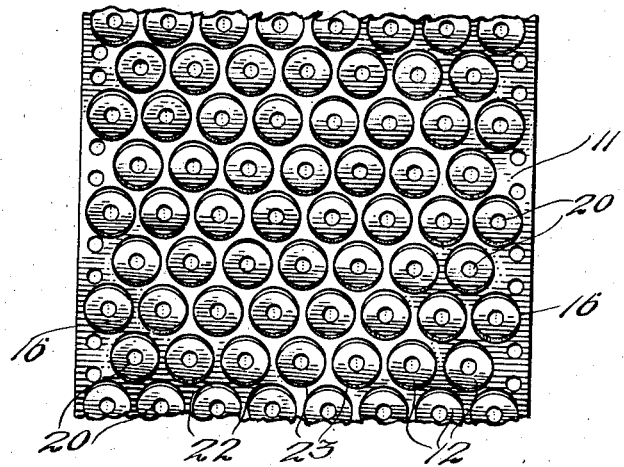
Figures 2, 3, 4:
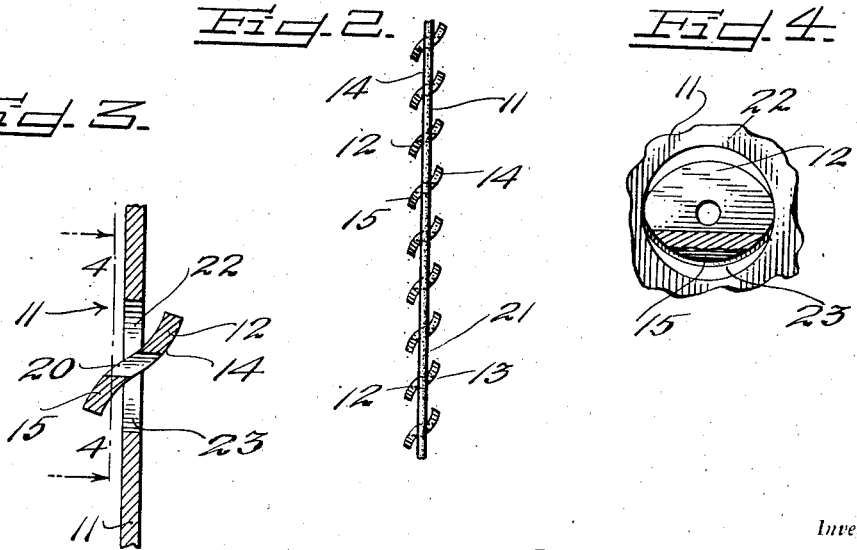

Other features and advantages will become more readily apparent from the following description and the accompanying illustrative drawings in which:

Figure 1 is a plan view of a section of stamped material of which the screen is formed, Figure 2 is an edge view thereof after being formed, Figure 3 is an enlarged detail, and Figure 4 is an enlarged section on line 4—4 of Figure 3.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claims. And while I have stated the primary field of utility of my invention it remains obvious that it may be employed in any other capacity wherein it may be found applicable.

In the accompanying drawings, and in the following specification, the same reference characters are used to designate the same parts and elements throughout and in which 11 indicates a sheet of rust-proof sheet metal or other material provided throughout with disks 12, the opposing upper and lower halves 14 and 15 of which are cut out, and the centers 16 of which remain integral with the sheet 11. In cross section these disks are of modified S-form, the outer ends 15 being curved down and the inner portions 14 being curved up, said outer portions being adapted to shed falling moisture and both inner and outer portions 14 and 15 substantially screening the openings. Each of said disks 12, are provided with center apertures 20, which will permit of vision through the screen from the inside 21, and for the admission of light which also enters through the apertures 22 and 23, formed by said cut out elements 12.

While sheet metal, such for instance as copper or zinc, may be used for the above described screen, still it may be formed of a weatherproof rippled surfaced clear plastic or the like through which light will freely pass, but through the material itself vision is obstructed. The sheets may be made of any suitable sizes and are adapted to be cut to fit into any size of frames.

It is obvious that the disks 12, may be of such small diameter that the apertures 20, 22 and 23, may be too reduced to permit the passage of insects.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

1. A screening formed of sheet material having disks partially struck therefrom bent at an angle relative to the material partially on both sides thereof and curved to shed falling moisture, said disks having apertures formed therein.

2. A screening formed of sheet material having disks partially struck therefrom bent at an angle relative to the material partially on both sides thereof and curved to shed falling moisture.

3. A screening formed of sheet material having disks partially struck therefrom bent at an angle relative to the material partially on both sides thereof.

DONG MON GEE MAINWAL.

REFERENCES CITED

The following references are of record in the file of this patent:

UNITED STATES PATENTS

| Number | Name | Date |
| --- | --- | --- |
| 1,027,917 | Smith | May 28, 1912 |
| 1,360,929 | Gough | Nov. 30, 1920 |